United States Patent [19]

Wade

[11] Patent Number: 5,289,330

[45] Date of Patent: Feb. 22, 1994

[54] HELICAL READ/WRITE HEAD HAVING A CROSS-CUT GROOVE

[75] Inventor: Gerald J. Wade, Littleton, Colo.

[73] Assignee: Alliant Techsystems Inc., Edina, Minn.

[21] Appl. No.: 771,043

[22] Filed: Oct. 2, 1991

[51] Int. Cl.$^5$ .................. G11B 5/187; G11B 21/021; G11B 5/52

[52] U.S. Cl. ...................... 360/122; 360/84; 360/107

[58] Field of Search ................ 360/122, 84, 107

[56] References Cited

U.S. PATENT DOCUMENTS

| | | | |
|---|---|---|---|
| 3,247,329 | 4/1969 | Tomita et al. | 360/107 |
| 3,398,870 | 8/1968 | Mullar et al. | 360/122 |
| 3,440,360 | 4/1969 | Sugaya et al. | 179/100.2 |
| 3,912,144 | 10/1975 | Arseneault et al. | 360/84 |
| 3,947,887 | 3/1976 | Platter | 360/103 |
| 4,055,849 | 10/1977 | Hickok | 360/77 |
| 4,257,076 | 3/1981 | Shimizu et al. | 360/130.24 |
| 4,375,656 | 3/1983 | Radman, Jr. et al. | 360/102 |
| 4,408,317 | 10/1983 | Gilovich et al. | 360/84 |
| 4,414,588 | 11/1983 | Hathaway | 360/84 |
| 4,524,402 | 6/1985 | Ueda et al. | 360/84 |
| 4,531,170 | 7/1985 | Takei et al. | 360/119 |
| 4,622,614 | 11/1986 | Yamashita et al. | 360/118 |
| 4,636,898 | 1/1987 | Suzuki et al. | 360/122 |
| 4,642,711 | 2/1987 | Yunoki et al. | 360/84 |
| 4,652,955 | 3/1987 | Niwa et al. | 360/121 |
| 4,704,788 | 11/1987 | Eckstein | 29/603 |
| 4,769,899 | 9/1988 | Yasuda et al. | 29/603 |
| 4,772,967 | 9/1988 | Okuda et al. | 360/84 |
| 4,788,611 | 11/1988 | Kobayashi et al. | 360/120 |
| 4,814,922 | 3/1989 | Osanai | 360/130.3 |
| 4,849,839 | 7/1989 | Tsubota et al. | 360/84 |
| 4,853,814 | 8/1989 | McClure | 360/122 |
| 4,870,521 | 9/1989 | Okabayashi | 360/103 |
| 4,879,620 | 11/1989 | Yamashita | 360/123 |
| 4,888,657 | 12/1989 | Lacey et al. | 360/122 |
| 4,899,241 | 2/1990 | Miyakawa et al. | 360/125 |
| 4,910,621 | 3/1990 | Matsuda et al. | 360/104 |
| 4,939,715 | 7/1990 | Vogelgesang et al. | 360/93 |
| 4,956,737 | 9/1990 | Brock | 360/122 |
| 4,962,584 | 10/1990 | Matsuda et al. | 29/603 |

FOREIGN PATENT DOCUMENTS 57-200922 6/1981 Japan .
59-213013 5/1983 Japan .

OTHER PUBLICATIONS

Yoneda, K. and Sawada T., "Simulation of Tape Flying Characteristics on VTR Drum Considering In-Plane Stress", IEEE Translation Journal on Magnetics in Japan, vol. 4, No. 2, Feb., 1989.

Primary Examiner—Edward P. Westin
Assistant Examiner—Benjamin D. Driscoll
Attorney, Agent, or Firm—Sheridan Ross & McIntosh

[57] ABSTRACT

An improved helical read/write head is disclosed having a cross-cut groove disposed on the lead sloping surface thereof to improve reliability. The cross-cut groove is positioned between the magnetic gap of the helica head and an initial head/tape interface region of the head and is preferably oriented perpendicular to the longitudinal axis/direction of travel of the tape. The cross-cut groove may be particularly positioned to accommodate and dampen tape disruption attendant to initiating the helical head/tape interface.

14 Claims, 5 Drawing Sheets

HELICAL READ/WRITE HEAD HAVING A CROSS-CUT GROOVE

TECHNICAL FIELD OF THE INVENTION

The present invention relates to helical scan data storage systems, and more particularly, to a helical read/write head having a cross-cut groove disposed to improve the operative interface between the head and magnetic tape.

BACKGROUND OF THE INVENTION

Helical scan data storage systems are used to store large amounts of data at a high rate on a magnetic tape. High speed is achieved through use of one or more (typically two) relatively small helical read/write heads mounted to slightly project from a rapidly rotating drum. The rotating heads interface with a magnetic tape driven relative thereto at a substantially lower rate over a portion of the drum circumference (e.g., over 45° or more). The tape converges rapidly upon a sloped leading surface of each helical head (i.e., a surface typically angled approximately 1.8°−2.5° relative to a tangent at the head magnetic gap), and is oriented at an acute angle relative to the plane in which the helical heads rotate. In this manner, data is recorded on the tape in alternate, repeated fashion by the heads in "helical" tracks (or swipes).

In order to realize accurate storage/retrieval of data on the magnetic tape, an intimate relationship between the magnetic head gap and the magnetic tape is necessary. As will be appreciated by those skilled in the art, even minor disruptions to such interface may cause a depreciation in reliability.

The achievement of a desirable helical head/tape interface is complicated by several factors unique to helical scan systems. In particular, and unlike other tape systems, helical head/tape interface must be repeatedly, rapidly and reliably established as a helical head rotates into and out of close proximity with the driven tape. Concomitantly, due to the high speed/relative motion/-rapid convergence of the small head and tape surfaces, and air drag associated therewith, a relatively large and inconsistent air bearing can be generated therebetween. Relatedly, it has been found that as the tape and the head converge in helical systems tape disruption, or stretching, approximating a tension and/or displacement standing wave form in the tape may be introduced between the lead sloping surface (i.e., the "landing" or "wear" surface) and magnetic gap of a helical head. As a result, helical head/tape interface can be significantly degraded. Further, due to the interface air bearing the tape may be drawn towards drum recesses surrounding the helical heads, resulting in further undesirable tape motion instability (e.g., due to tape stretching). Finally, due to the small head size, high-speed drum/tape interface, and additional above-noted factors, any contaminants introduced into the interface can be particularly destructive in helical systems.

Numerous techniques have previously been suggested to improve the establishment and maintenance of the desired interface between heads and tapes in helical systems Such techniques have focused on, for example, head contours, lowering head velocities, mechanically increasing tape tension, and utilizing thinner tapes. As will be appreciated, however, such modifications have tended to detract from overall system performance.

SUMMARY OF THE INVENTION

Accordingly, the broad objective of the present invention is to improve the interface between a helical read/write head and a tape in a helical scan data storage system, without otherwise degrading system performance. Reliability of the system is improved by reducing and otherwise stabilizing the air bearing between the helical head and the tape; by dampening tape disruptions in the tape near the helical head magnetic gap; and by reducing contaminants in the helical head/tape interface.

The aforementioned improvements are achieved in the present invention by providing a transverse groove, i.e., "cross-cut", from one side to the other in the helical head. More particularly, for a given helical scan system, the cross-cut groove is disposed on the lead sloping surface of the face of the helical head between the region where the tape initially converges upon and interfaces with the rotating helical head and the magnetic gap of the helical head. For purposes hereof, the initial interface region of the lead sloping surface of a helical head is meant to be that region where, due to the convergence and motion of the head/tape surfaces, the establishment of an air bearing therebetween is initiated. Preferably, the groove is positioned between any portion of the initial interface region that is subject to non-uniform wear across the head and the magnetic gap. Further, the groove is preferably disposed perpendicular to the longitudinal axis/direction of tape travel.

By providing such a cross-cut groove, it has been found that the evacuating effect thereof will generally reduce air-bearing volume and variability; reduce contaminant introduction into the tape/helical head interface; and provide a dynamic means for tape disruption dampening to maintain the desired interface at the magnetic gap (i.e., by drawing the tape towards and possibly into the groove). Additionally, properly positioned, the crosscut groove can particularly serve to dampen tape disruptions occasioned in helical systems by the rapid convergence of the helical head and magnetic tape. As previously indicated, such tape disruptions approximate a standing wave form.

As such, the cross-cut groove may be advantageously disposed for a given helical system such that one or more selected half-period portions of the approximate standing wave form is substantially accommodated in the cross-cut groove. That is, it is desirable that the groove position and width be selected so that nodes of the approximate standing wave corresponding with, or defining, the selected half-period(s) will be substantially accommodated within the groove. Additionally, the depth of the cross-cut groove is preferably selected to be large enough to accommodate the peak amplitude for the selected half-period(s). In this manner, the cross-cut groove can substantially dampen the approximate standing wave tape disruption, while also reducing deleterious tape/head contact.

Additionally, in a preferred embodiment of the present invention, the cross-cut groove is positioned on the lead sloping surface a predetermined distance from the magnetic gap to avoid influencing the desired magnetic field in the magnetic gap. Also, the cross-cut groove is positioned a predetermined distance away from the window in the core of the helical head so that the necessary magnetic flux through the core is maintained. Finally, the cross-cut groove is preferably positioned to be effective for as much of the life of the helical head as possible as the head is worn during use.

Additional advantages of the present invention can be further appreciated and readily realized by providing a cross-cut groove on both sides of the magnetic gap of a helical head. For example, in a typical single head arrangement an additional cross-cut groove can be provided on the trailing surface of the helical head to act in tandem with the cross-cut groove on the leading surface for dampening and otherwise reducing tape disruptions. Similarly, in a read-after-write, dual helical head arrangement, cross-cut grooves can be provided on the oppositely-facing, sloped surfaces of each helical head to obtain tandem tape disruption dampening.

It is believed that typical applications of the present invention include helical scan data storage systems employing a head-to-tape relative velocity of approximately 200 in./sec. to 1000 in./sec.; a tape tension of approximately 5 gms. to 100 gms.; and a tape thickness of approximately $4\mu m$ to $20\mu m$. It is further believed that advantages attendant to the present invention can be realized in such typical systems when the edge of the cross-cut groove closest to the magnetic gap is positioned between approximately $100\mu m$ to $400\mu m$ from the magnetic gap, and when the groove has a width of approximately $100\mu m$ to $400\mu m$, and a depth of approximately $20\mu m$ to $100\mu m$.

BRIEF DESCRIPTION OF THE DRAWINGS

Other features and advantages of the present invention will become apparent from the following description taken in conjunction with the accompanying drawings, wherein.

DETAILED DESCRIPTION OF THE PREFERRED EMBODIMENTS

Figure 1:
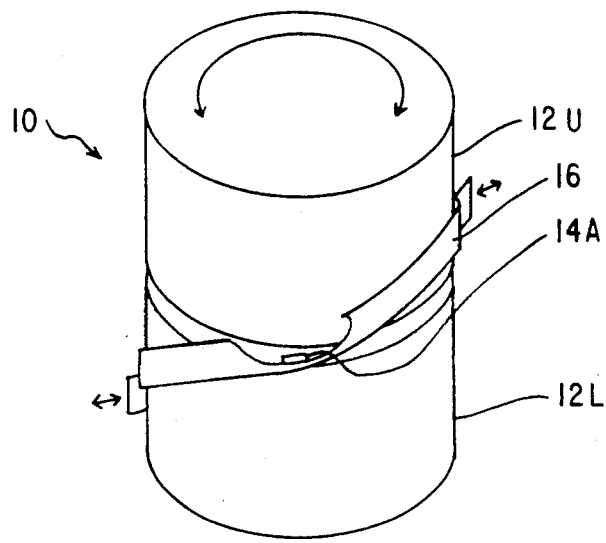
FIGS. 1 and 2 representatively illustrate, from a perspective and top view, respectively, components of a typical helical data storage system.
Figure 2:
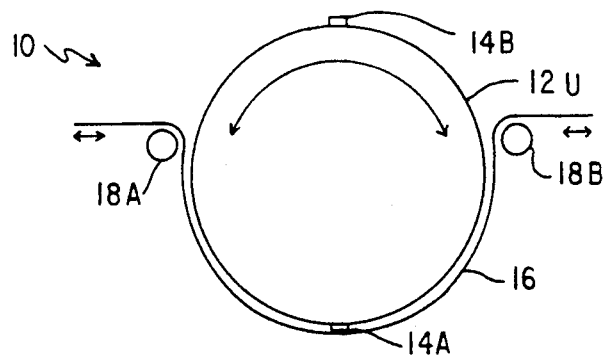

FIGS. 1 and 2 representatively illustrate components of a typical helical scan data storage system 10. Such systems include a drum having a lower drum member 12L which remains in a fixed position and an upper drum member 12U which rotates at a high speed. (Alternatively, upper drum member 12U may be fixed and lower drum member 12L may rotate or be fixed in some applications.) Helical system 10 further includes helical read/write heads 14A and 14B which are mounted on the outer circumferential surface of rotating upper drum member 12U and protrude slightly therefrom (e.g., about $40\mu m$–$50\mu m$) so that the helical heads 14A, 14B may establish the necessary interface to magnetically record data on or reproduce date from magnetic tape 16 which is driven at an acute angle relative to the plane of rotation of helical heads 14A,14B.

Figure 3:
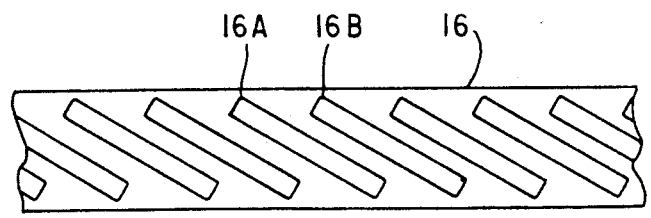
FIG. 3 representatively illustrates helical tracks recorded on a magnetic tape in helical data storage systems.

As best shown in FIG. 2., tape 16 "wraps" around drum members 12L and 12U so that an acceptable interface between helical heads 14A and 14B and tape 16 can be established and maintained. Tape 16 is driven at a velocity substantially lower than the surface velocity of upper drum member 12U. Tape 16 is guided by guide members 18A and 18B positioned on opposing sides of drum member 12U. Since helical heads 14A and 14B are moving at an angle relative to and at a much higher velocity than tape 16, successive corresponding helical tracks 16A and 16B are recorded on tape 16 as representatively illustrated in FIG. 3. In this manner, a large amount of data may be compactly recorded on/read from the tape 16 at a rapid rate.

Figure 4:
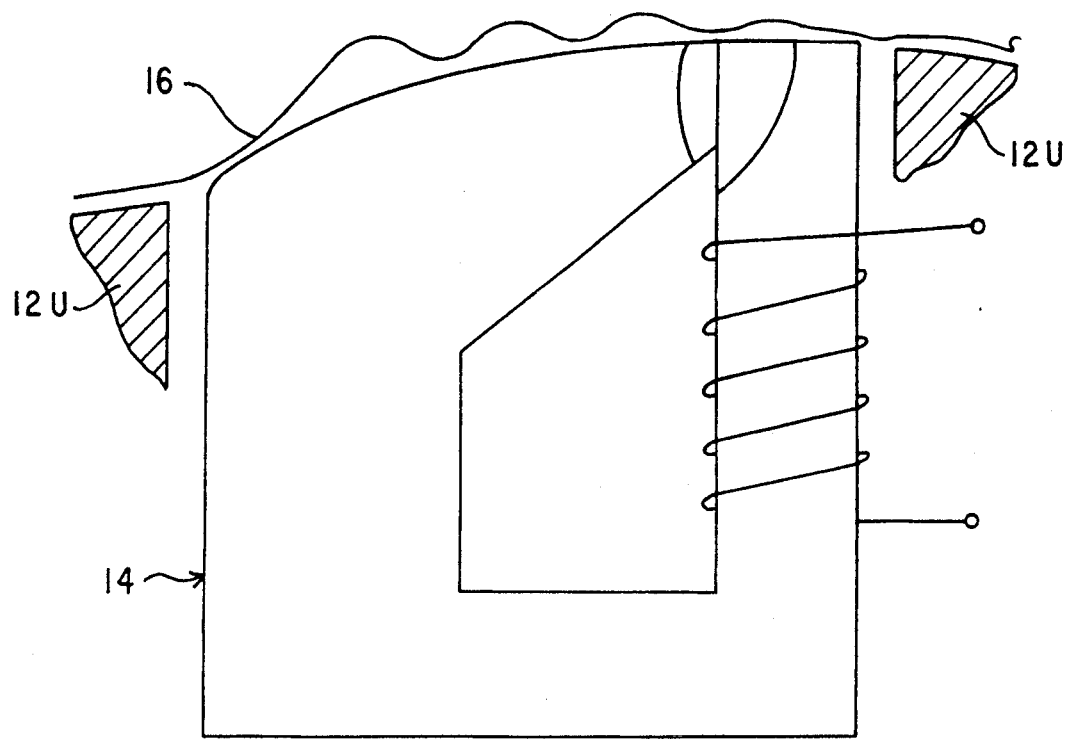
FIG. 4 representatively illustrates an interface between a magnetic tape and a prior art helical read/write head.

FIG. 4 representatively illustrates an interface between a magnetic tape 16 and a prior art helical read/write head 14 in a typical helical scan data storage system 10. As illustrated, disruption or stretching, in the magnetic tape 16 occurs upon each rapid and repeated interface of the converging helical read/write head 14 and magnetic tape 16, thereby adversely impacting the ability to rapidly establish the desired air bearing and operative interface therebetween. Such tape disruption has been found to approximate a standing wave form. As further representatively illustrated in FIGS. 4 and 5, a "bullet-nose" wear region 19 is typically defined in helical read/write head 14 during use. It should be appreciated that bullet-nose region 19 reflects non-uniform wear across the head. That is, opposing edge portions of the head are worn relative to the longitudinal center portion to define the bullet-nose shape.

Figure 6:
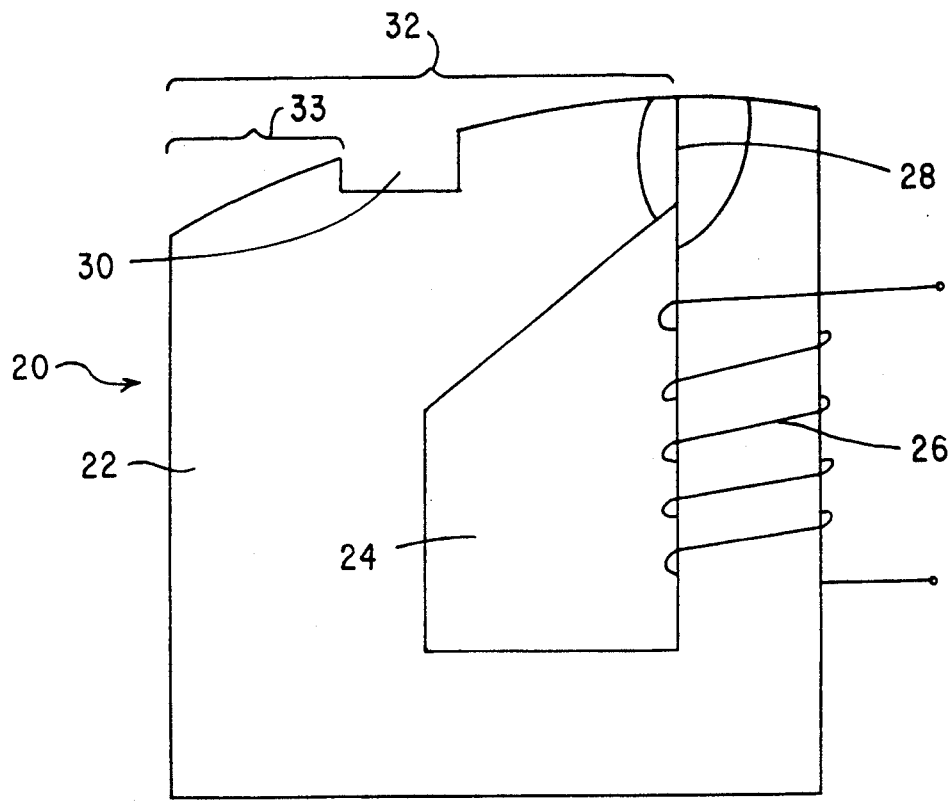
FIG. 6 representatively illustrates a side view of an embodiment of a helical read/write head according to the present invention.
Figure 8:
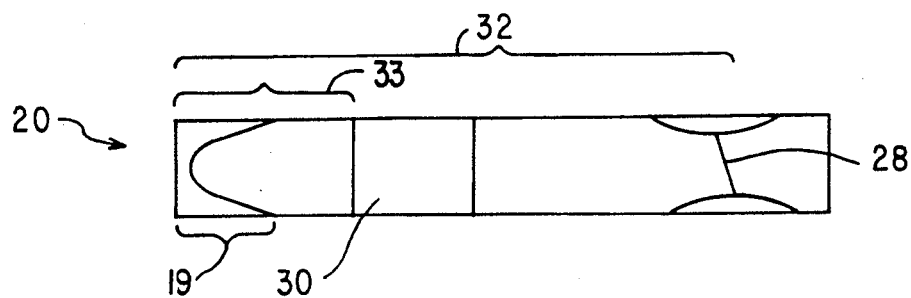
FIG. 8 representatively illustrates a top view of the embodiment of the helical read/write head illustrated in FIG. 7 according to the present invention.
Figure 7:
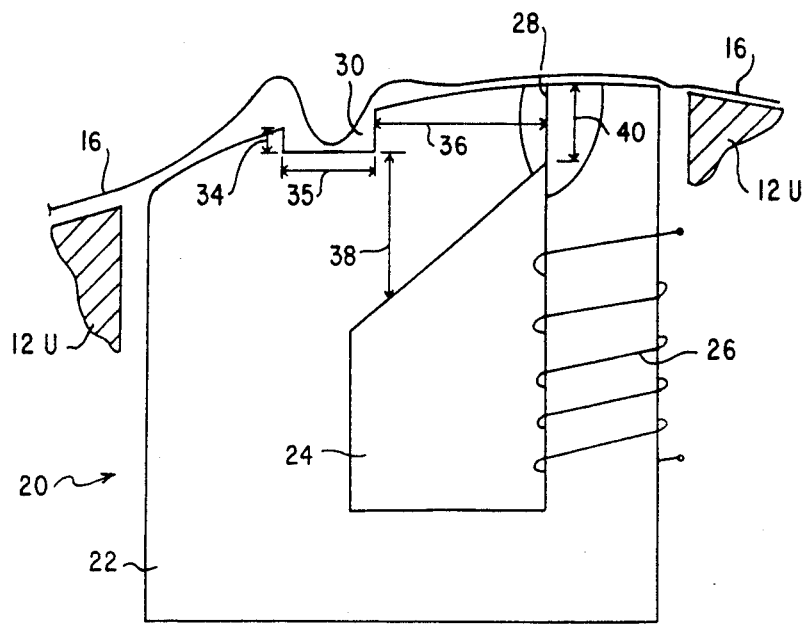
FIG. 7 representatively illustrates an interface between a magnetic tape and an embodiment of a helical read/write head according to the present invention.

FIGS. 6-8 representatively illustrate an embodiment of a helical read/write head 20 comprising the present invention. Helical head 20 includes a core 22 having a window 24 therethrough. Coil winding 26 is wound around a portion of magnetic core 22 through head window 24 to induce magnetic flux in core 22 such that magnetic gap 28 can be employed to magnetically record on/reproduce from a magnetic tape 16.

Of particular importance, the face of helical head 20 includes a cross-cut groove 30 disposed across the lead sloping surface 32 of the helical head 20 between an initial tape interface region 33 and magnetic gap 28. Preferably, cross-cut groove 30 is disposed sufficiently towards magnetic gap 28 so that it will not cross any bullet-nose region 19 that is defined during use (see e.g. FIG. 7). Cross-cut groove 30 is also preferably oriented perpendicular to the longitudinal axis/direction of movement of the magnetic tape 16. As indicated, the provision of cross-cut groove 30 significantly contributes to the establishment and maintenance of the desired magnetic interface between the helical head magnetic gap 28 and a magnetic tape 16.

Specifically, cross-cut groove 30 provides a means for evacuating air between sloped leading surface 32 of the rotating head 20 and the rapidly converging magnetic tape 16. Due to such evacuation, the air bearing between the head 20 and magnetic tape 16 can be reduced and otherwise stabilized. Further, tape disruptions can be reduced since the evacuating air may tend to draw the tape 16 toward and possibly into cross-cut groove 30 to yield a dynamically responsive dampening, or tensioning, function at the magnetic gap 28. Relatedly, the groove 30 has the effect of scraping contaminants from the tape 16 and otherwise removing contaminants from the head/tape interface.

Cross-cut groove 30 may be disposed to further improve reliability by dampening any tape disruption attendant to initiating the interface between the helical head 20 and a magnetic tape 16 (see FIG. 6). In this regard, and as previously noted, it has been recognized that, for a given helical system, such disruption, or tape stretching, may approximate a standing wave form.

To particularly address this interface phenomena, the cross-cut groove 30 is preferably positioned on helical head 20 such that the position of groove 30 has a specific relationship to the approximate standing wave created in tape 16. More particularly, and as shown in FIG. 6, cross-cut groove 30 is preferably positioned and sized for a given system to accommodate at least one selected half-period portion of the approximate standing wave form. Thus, from a sizing standpoint, the nominal width 35 of groove 30 is preferably selected to substantially accommodate the selected half-period portion(s) between the corresponding nodes, and the nominal depth 34 of groove 30 is preferably selected to substantially accommodate the amplitude(s) of the peak(s) of the selected half-period(s). In this manner, the standing wave can be dampened as shown in FIG. 6, while reducing any likelihood of deleterious tape/head contact.

In addition to the foregoing, cross-cut groove 30 is preferably positioned a predetermined distance 36 from magnetic gap 28 to substantially avoid any influence upon the desired magnetic field thereof. Relatedly, distance 36, as well as the distance 38 from the bottom of groove 30 to the top of window 24, are preferably selected so that a sufficient core cross-section will be maintained to accommodate the necessary magnetic flux as the head wears down during use.

As previously noted, it is believed that typical applications of the present invention include helical data systems employing a head-to-tape relative velocity of approximately 200 in./sec. to 1000 in./sec.; a tape tension of approximately 5 gms. to 100 gms.; and a tape thickness of approximately 4μm to 20μm. It is further believed that advantages attendant to the present invention can be realized in such typical systems when the edge of the cross-cut groove closest to the magnetic gap is positioned between approximately 100μm to 400μm from the magnetic gap, and when the groove has a width of approximately 100μm to 400μm and a depth of approximately 20μm to 100μm. More particularly, it has been demonstrated that in a typical helical data storage system of the described nature, a cross-cut groove positioned and having the following dimensions will yield significant reliability advantages: a cross-cut groove to magnetic gap distance of approximately 250μm, a cross-cut width of approximately 250μm, and a cross-cut depth of approximately 30μm.

Figure 5:
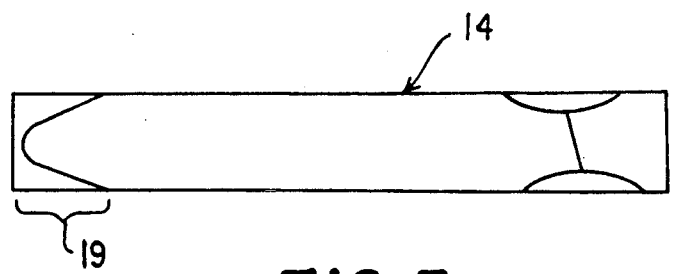
FIG. 5 representatively illustrates a top view of a prior art helical read/write head.
Figure 10:
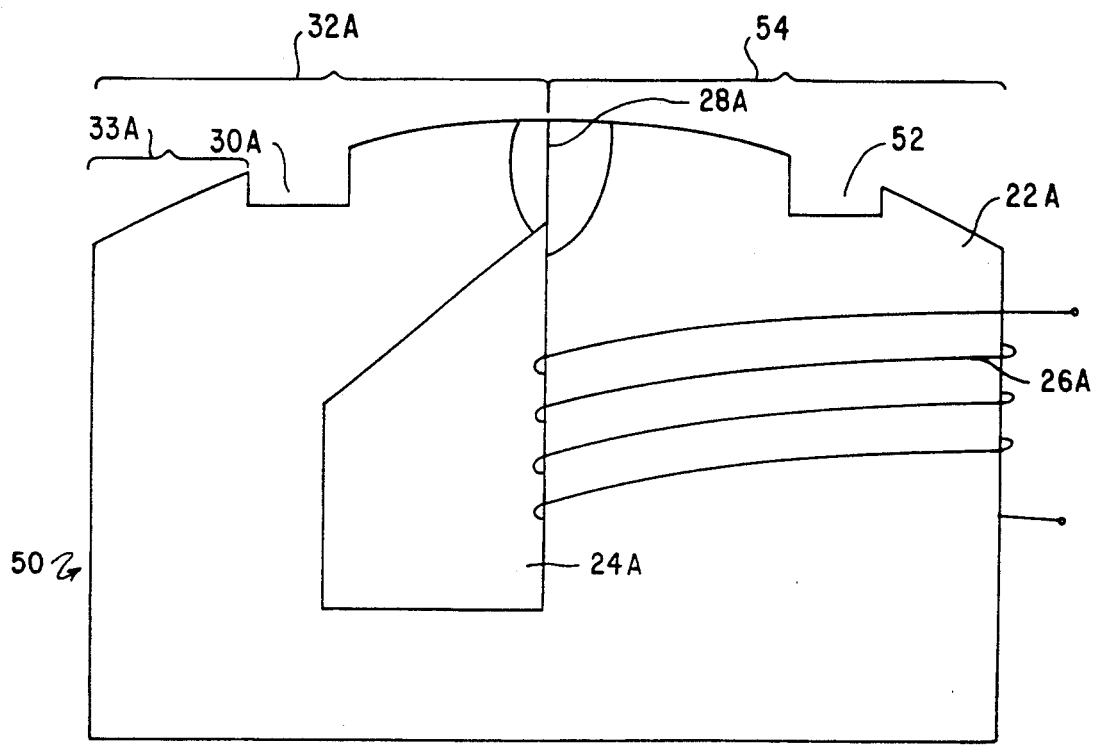
FIG. 10 representatively illustrates a read-after-write head implementation of the present invention.

Another embodiment of the present invention is shown in FIG. 10. Like reference numerals to those utilized in FIGS. 4–6 are employed to reference equivalent features. In the helical head 50 of FIG. 10, an additional cross-cut groove 52 is provided on a trailing surface 54 of helical head 50, and also serves to dampen tape disruptions, including for example, tape disruption, or stretching, attendant to the tape drawing effects of the drum recess surrounding the helical head. Preferably, the additional cross-cut groove 52 is positioned perpendicular to the longitudinal axis/direction of travel of the interfacing magnetic tape 16. Cross-cut grooves 30A and 52 act in tandem to tension, or dampen, a magnetic tape 16 to establish and maintain an intimate relationship between the tape 16 and the helical head 50.

Figure 9:
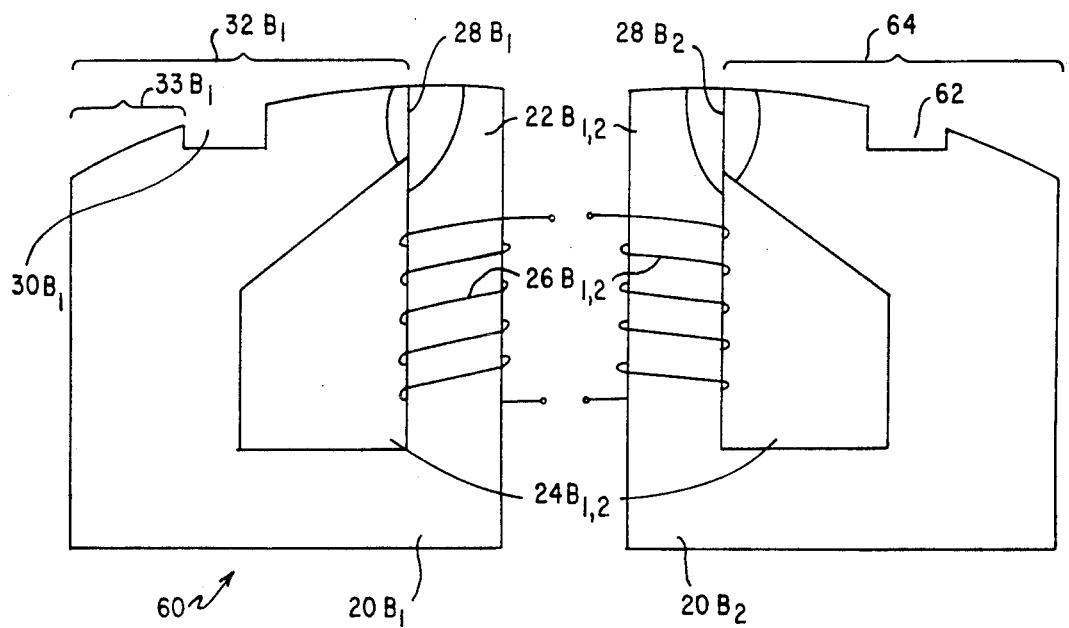
FIG. 9 representatively illustrates a helical read/write head according to another embodiment of the present invention.

FIG. 9 illustrates a read-after-write implementation of the present invention. Again, like reference numerals to those utilized in to FIGS. 4–6 are employed to reference equivalent features. In the dual head arrangement 60, cross-cut grooves $30B_1$ and 62 are disposed on the oppositely-facing, sloped surfaces 32B and 64 of the juxtaposed helical heads $20B_1, 20B_2$ to yield tandem dynamic tape dampening advantages.

From the foregoing description, it will be appreciated by those skilled in the art that modifications or improvements may be made to the embodiments disclosed herein without departing from the concepts disclosed. The scope of protection afforded is to be determined by the claims which follow and the breadth of interpretation that the law allows.

What is claimed is:

1. In a helical scan data storage system having at least one helical head rotating in a first plane and a magnetic tape driven relative to said at least one rotating helical head and positioned to repeatedly and operatively interface with a face of said at least one rotating helical head at an acute angle relative to said first plane, at least a first improved helical head comprising:

a magnetic gap disposed across the face of said first helical head for magnetically interfacing with said magnetic tape;

a lead sloping surface on one side of said magnetic gap on said face, and having an initial interface region that initially and repeatedly interfaces with said magnetic tape;

a groove laterally disposed across said lead sloping surface between said initial interface region of said lead sloping surface and said magnetic gap so as to inwardly draw and receive, and thereby dynamically dampen, magnetic tape disruption approximating a standing wave attendant to said initial and repeated interface between said initial interface region of said lead sloping surface and said magnetic tape, wherein an edge of said groove nearest to said magnetic gap is positioned between approximately 100μm and 400μm from the magnetic gap, the width of said groove is between approximately 100μm and 40μm, and the depth of said groove is between approximately 20μm and 100μm.

2. In a helical scan data storage system, at least a first improved helical head as claimed in claim 1, wherein said groove is positioned substantially perpendicular to the longitudinal axis of said magnetic tape.

3. In a helical scan data storage system, at least a first improved helical head as claimed in claim 1, wherein said groove is disposed to receive at least one selected half-period of said approximate standing wave.

4. In a helical scan data storage system, at least a first improved helical head as claimed in claim 1, wherein the width and positioning of said groove is selected so that the edges of the groove substantially coincide with the nodes of said approximate standing wave defining said at least one selected half-period.

5. In a helical scan data storage system, at least a first improved helical head as claimed in claim 1, wherein the depth of said groove is selected to receive the peak amplitude of said at least one selected half-period of said approximate standing wave.

6. In a helical scan data storage system, at least a first improved helical head as claimed in claim 1, said first improved helical head further comprising:
- a trailing surface disposed on another side of said magnetic gap on said face and sloping away from said magnetic gap; and
- a groove laterally disposed across said trailing surface of said helical head.

7. In a helical scan data storage system, at least a first improved helical head as claimed in claim 1, wherein said first improved head is provided to write onto said magnetic tape, and further comprising a second improved helical head juxtaposed to said first improved helical head and provided to read from said magnetic tape, said second improved helical head comprising:
- a magnetic gap disposed across a face of said second helical head for magnetically interfacing with said magnetic tape during use;
- a sloping surface on one side of said magnetic gap on said face of said second improved helical head; and
- a groove laterally disposed across said sloping surface on said second helical head.

8. A helical head for use in a helical scan data storage system, comprising:
- a magnetic gap disposed across a face of said helical head for magnetically interfacing with a magnetic tape during use;
- a lead sloping surface disposed on one side of said magnetic gap and having an initial interface region for initially and repeatedly interfacing with said magnetic tape during use;
- a cross-cut groove laterally disposed at a selected location across said lead sloping surface between said magnetic gap and said initial interface region so as to draw inwardly, and thereby dynamically dampen, magnetic tape disruption attendant to said initial and repeated interface between said initial interface region of said lead sloping surface and said magnetic tape, wherein an edge of said cross-cut groove nearest to said magnetic gap is positioned between approximately 100μm and 400μm from the magnetic gap, the width of said groove is between approximately 100μm and 40μm, and the depth of said groove is between approximately 20μm and 100μm.

9. A helical head as claimed in claim 8, said cross-cut groove having a selected width, wherein said selected location and said selected width are established to receive at least one selected half-period of any tape disruption approximating a standing wave attendant to said initial interface of said initial interface region of said lead sloping surface and said magnetic tape.

10. A helical head as claimed in claim 8, said cross-cut groove having a selected depth, wherein said selected location and said selected width are established to receive at least one selected half-period of any tape disruption approximating a standing wave attendant to said initial interface of said initial interface region of said lead sloping surface and said magnetic tape.

11. A helical head as claimed in claim 8, wherein said cross-cut groove is disposed substantially perpendicular to the longitudinal axis of said magnetic tape.

12. A helical head as claimed in claim 8, further comprising:
- a trailing surface disposed on the other side of said magnetic gap on said face; and
- a groove disposed across said trailing surface of said helical head.

13. A helical head as claimed in claim 8, said cross-cut groove having a selected width, wherein said selected location and said selected width are established to substantially avoid influencing said magnetic interface between said magnetic gap and said magnetic tape during use.

14. A helical head as claimed in claim 8, said cross-cut groove having a selected width and depth, wherein said selected location, width and depth are established to maintain sufficient core material between said cross-cut groove and a window in said helical head for magnetic flux passage therethrough during use.

* * * * *